United States Patent
Nair et al.

(10) Patent No.: US 7,848,749 B2
(45) Date of Patent: Dec. 7, 2010

(54) METHOD AND APPARATUS FOR ACTIVATING A DORMANT MOBILE UNIT IN A DISTRIBUTED NETWORK

(75) Inventors: Sureshbabu P. Nair, Whippany, NJ (US); Ajay Rajkumar, Morristown, NJ (US); Michael D. Turner, Madison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 80 days.

(21) Appl. No.: 10/984,020

(22) Filed: Nov. 8, 2004

(65) Prior Publication Data

US 2006/0099973 A1    May 11, 2006

(51) Int. Cl.
*H04W 4/00* (2009.01)
*H04W 36/00* (2009.01)

(52) U.S. Cl. ........................ 455/435.1; 455/438

(58) Field of Classification Search .......... 455/445, 455/461, 481, 432.1, 434, 435.1, 438; 370/396, 370/397, 401, 230, 230.1, 231
See application file for complete search history.

(56) References Cited

U.S. PATENT DOCUMENTS

| | | | |
|---|---|---|---|
| 6,529,515 B1 * | 3/2003 | Raz et al. | 370/401 |
| 6,665,533 B1 * | 12/2003 | Sakoda | 455/414.2 |
| 6,909,899 B2 * | 6/2005 | Wang et al. | 455/436 |
| 7,103,662 B2 * | 9/2006 | Ray et al. | 709/225 |
| 7,170,857 B2 * | 1/2007 | Stephens et al. | 370/230 |
| 7,190,687 B1 * | 3/2007 | Hsu et al. | 370/338 |
| 2002/0041576 A1 * | 4/2002 | Chang et al. | 370/331 |
| 2002/0068565 A1 * | 6/2002 | Purnadi et al. | 455/436 |
| 2002/0193110 A1 * | 12/2002 | Julka et al. | 455/432 |
| 2002/0196749 A1 * | 12/2002 | Eyuboglu et al. | 370/328 |
| 2003/0099214 A1 * | 5/2003 | Schmidt et al. | 370/328 |
| 2003/0135626 A1 * | 7/2003 | Ray et al. | 709/228 |
| 2003/0143999 A1 * | 7/2003 | Funato et al. | 455/435 |
| 2003/0145091 A1 | 7/2003 | Peng et al. | 709/229 |
| 2004/0062227 A1 * | 4/2004 | Sayeedi | 370/350 |
| 2004/0174866 A1 * | 9/2004 | Matsuda et al. | 370/352 |

(Continued)

FOREIGN PATENT DOCUMENTS

EP    1 533 957 A2    1/2003

OTHER PUBLICATIONS

International Search Report EP 05 25 6620 dated Mar. 29, 2006.
CDMA2000 High Rate Packet Data Air Interface Specification; 3$^{rd}$ Generation Partnership Project 2 "3GPP2" Version 1.0; Date: Mar. 2004 www://http:222.3gpp2.org/Public_htm/specs/C.S0024-A_v1.0_040331.pdf.
International Search Report EP 05 25 6620 dated Jan. 27, 2006.

*Primary Examiner*—George Eng
*Assistant Examiner*—Christopher M Brandt
(74) *Attorney, Agent, or Firm*—Williams, Morgan & Amerson

(57) ABSTRACT

The present invention provides a method of wireless telecommunication in a distributed network comprised of a plurality of access points. The method includes receiving information indicating that a dormant call session is to be activated. The method also includes providing an identifier indicative of the dormant call session. The identifier includes information indicative of an access point having information indicative of a state of the call session stored thereon.

8 Claims, 3 Drawing Sheets

U.S. PATENT DOCUMENTS

| | | |
|---|---|---|
| 2004/0203780 A1* | 10/2004 | Julka et al. .................. 455/436 |
| 2004/0214574 A1* | 10/2004 | Eyuboglu et al. ........... 455/439 |
| 2005/0009531 A1* | 1/2005 | Lindquist et al. ......... 455/452.2 |
| 2005/0037792 A1* | 2/2005 | Rajkotia et al. ............. 455/517 |
| 2005/0050136 A1* | 3/2005 | Golla ......................... 709/200 |
| 2005/0113082 A1* | 5/2005 | Bender et al. ............ 455/422.1 |
| 2006/0013165 A1* | 1/2006 | Choi et al. ................... 370/331 |
| 2006/0166680 A1* | 7/2006 | Shintai et al. ............ 455/456.1 |

\* cited by examiner

METHOD AND APPARATUS FOR ACTIVATING A DORMANT MOBILE UNIT IN A DISTRIBUTED NETWORK

BACKGROUND OF THE INVENTION

1. Field of the Invention

This invention relates generally to a telecommunication system, and, more particularly, to a wireless telecommunication system.

2. Description of the Related Art

In conventional wireless telecommunications, one or more mobile units may establish a wireless link to a Radio Access Network (RAN). The RAN architecture is typically hierarchical and call state information associated with each mobile unit call session is stored in a central repository, such as a Radio Network Controller (RNC), a Packet Data Serving Node (PDSN), and the like. If the user of the mobile unit changes geographical location while the mobile unit is dormant, a paging process may be used to locate the mobile unit. For example, the paging process may be initiated when data intended for the mobile unit arrives at a radio network controller. Upon receiving the page, the mobile unit may transmit an identifier, such as a Unicast Access Terminal Identifier (UATI), which may be used to locate the appropriate call state information in the central repository. The mobile unit may also re-activate the dormant session, in which case the UATI is transmitted and used to locate the appropriate call state information in the central repository.

One alternative to the conventional hierarchical network architecture is a distributed architecture including a network of base station routers. For example, each base station router may combine RNC and/or PDSN functions in a single entity that manages radio links between one or more mobile units and an outside network, such as the Internet. Compared to hierarchical networks, distributed architectures have the potential to reduce the cost and/or complexity of deploying the network, as well as the cost and/or complexity of adding additional wireless access points, e.g. base station routers, to expand the coverage of an existing network. Distributed networks may also reduce (relative to hierarchical networks) the delays experienced by users because packet queuing delays at the RNC and PDSN of hierarchical networks may be reduced or removed.

In a distributed architecture, one or more mobile units may establish a call session with any one of the plurality of base station routers. Accordingly, each base station router should be capable of assigning an identifier, such as a UATI, to the mobile unit. For example, a proposed Code Division Multiple Access (CDMA) protocol standard, sometimes referred to as the EVolution-Data Only (EVDO) standard, specifies a unique 128-bit UATI that is assigned to a mobile unit when a call session is initiated by the mobile unit. The mobile unit maintains the UATI for the duration of the call session. In the current implementation, the EVDO call session UATI is divided into two parts: a 104-bit UATI104 and a 24-bit UATI024. The UATI024 portion is unique to the mobile unit for the duration of the call session and the UATI104 is common to all mobile units within a predetermined subnet of base station routers in the distributed network.

In operation, base station routers in a conventional distributed network broadcast, or advertise, their subnet address, e.g. the address indicated by the UATI104 portion of the UATI. However, the address is generally too long to advertise on a control channel, so the base station routers advertise an 8-bit alias to the subnet address called a color code. Mobile units may then determine whether or not the subnet including the base station router providing service to the mobile unit has changed by monitoring the advertised color code on the control channel. If the mobile unit detects a change in the color code, the mobile unit is typically required to request a new UATI. For example, a mobile unit may initiate a call session with a first base station router belonging to a first subnet having a first color code. The first base station router assigns a UATI to the mobile unit. If the mobile unit becomes dormant and later re-activates by sending a message to a second base station router belonging to a second subnet having a second color code, the mobile unit should request a new UATI from the second base station router.

However, the base station routers may have difficulty locating call session information associated with the dormant call session when the dormant mobile unit is re-activated. For example, after a mobile unit may initiate a call session with a first base station router, the mobile unit may be handed off to a second base station router, which may also receive and store the associated call state information. If the mobile unit then becomes dormant and later re-activates by sending a message to a third base station router, the third bas station router may not be able to locate the call session information stored on the second base station router.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a method of wireless telecommunication in a distributed network comprised of a plurality of access points is provided. The method includes receiving information indicating that a dormant call session is to be activated. The method also includes providing an identifier indicative of the dormant call session. The identifier includes information indicative of an access point having information indicative of a state of the call session stored thereon.

In another embodiment of the present invention, a method is provided for wireless telecommunication in a distributed network comprised of a plurality of access points. The method includes receiving information indicating that a dormant call session is to be activated and receiving an identifier indicative of the dormant call session. The method also includes identifying at least one of the plurality of access points based on the identifier, the at least one identified access point having information indicative of a state of the call session stored thereon.

In yet another embodiment of the present invention, a method is provided for wireless telecommunication in a distributed network comprised of a plurality of access points. The method includes accessing information indicative of a first access point, accessing information indicative of each of a plurality of second access points in an active set, and comparing the information indicative of the first access point and the active set. The method also includes requesting a call session identifier when a predetermined portion of the information indicative of the first access point differs from a predetermined portion of the information indicative of at least one of the plurality of second access points in the active set.

BRIEF DESCRIPTION OF THE DRAWINGS

The invention may be understood by reference to the following description taken in conjunction with the accompanying drawings, in which like reference numerals identify like elements, and in which.

Figure 1:
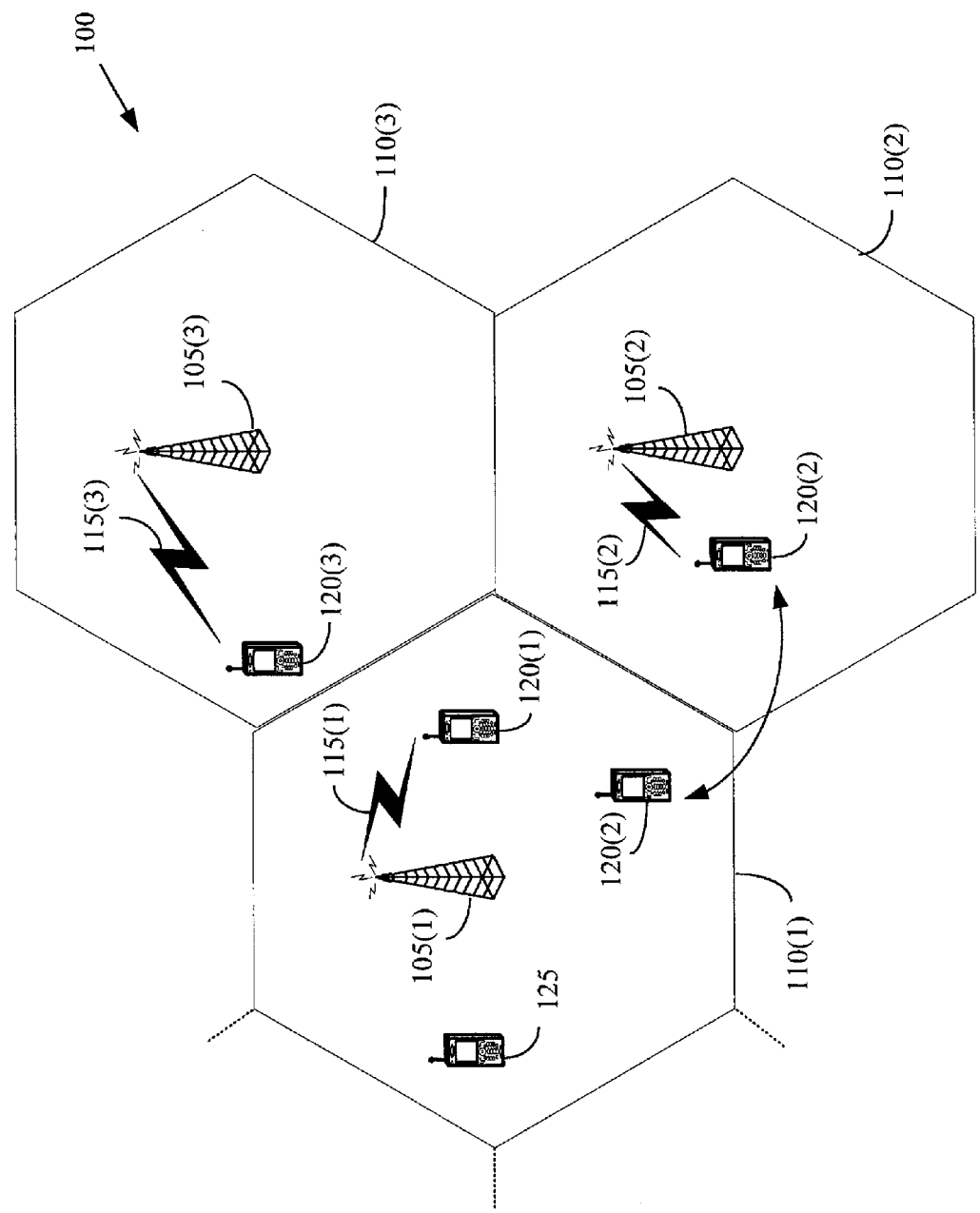
FIG. 1 conceptually illustrates a distributed wireless telecommunication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, an air interface, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one embodiment of a distributed wireless telecommunication system 100. In the illustrated embodiment, access points for the distributed wireless telecommunication system 100 include a distributed network of base station routers 105(1-5). Hereinafter, in the interest of clarity, the base station routers 105(1-5) will be referred to collectively by the index 105 unless the description is referring to a specific base station router 105, such as the base station router 105(1). Although the present invention will be described in the context of the distributed wireless telecommunication system 100 comprising a plurality of base station routers 105, persons of ordinary skill in the art should appreciate that the present invention is not limited to distributed wireless telecommunication systems 100 in which the access points are base station routers 105. In alternative embodiments, the distributed wireless telecommunication system 100 may include any desirable number and/or type of access point.

Each of the base station routers 105 may be capable of initiating, establishing, maintaining, transmitting, receiving, terminating, or performing any other desired action related to a call session with one or more mobile units, such as the mobile unit 110 shown in FIG. 1. For example, each base station router 105 may combine Radio Network Controller (RNC) and Packet Data Serving Node (PDSN) functions in a single entity. The base station routers 105 may also be configured to communicate with other base station routers 105, other devices, other networks, and the like in a manner known to persons of ordinary skill in the art.

The base station routers 105 provide wireless telecommunication links 115 to mobile units 110 within an associated geographic region, referred to hereinafter as a cell 120. Subsets of the base station routers 105 in the distributed wireless telecommunication system 100 may also be grouped into subnets 125(1-2). Each subnet 125(1-2) includes a subset of the base station routers 105, which provide wireless telecommunication links 115 to a subset of the cells 120. The subnets 125(1-2) have a subnet address, such as a 104-bit UATI address, and may also have an 8-bit alias to the subnet address called a color code. In the interest of clarity, only two subnets 125(1-2) having one and four base station routers 105, respectively, have been depicted in FIG. 1. However, persons of ordinary skill in the art should appreciate that the present invention is not limited to this illustrative exemplary embodiment. In alternative embodiments, any desirable number of subnets 125 including any desirable number of base station routers 105 may be used.

Each base station router 105 can create, assign, transmit, receive, and/or store information related to the call sessions established between the base station routers 105 and the one or more mobile units 110. This information will be collectively referred to hereinafter as call session state information, in accordance with common usage in the art. For example, the call session state information may include information related to an air interface protocol, one or more sequence numbers, a re-sequencing buffer, and the like. The call session state information may also include information related to a Point-to-Point Protocol (PPP), such as header compression information, payload compression information, and related parameters. Call session state information related to other protocol layers may also be created, transmitted, received, and/or stored by the base station routers 105. In one embodiment, the call session state information includes a call session identifier, such as a Unicast Access Terminal Identifier (UATI).

Figures 2, 3:
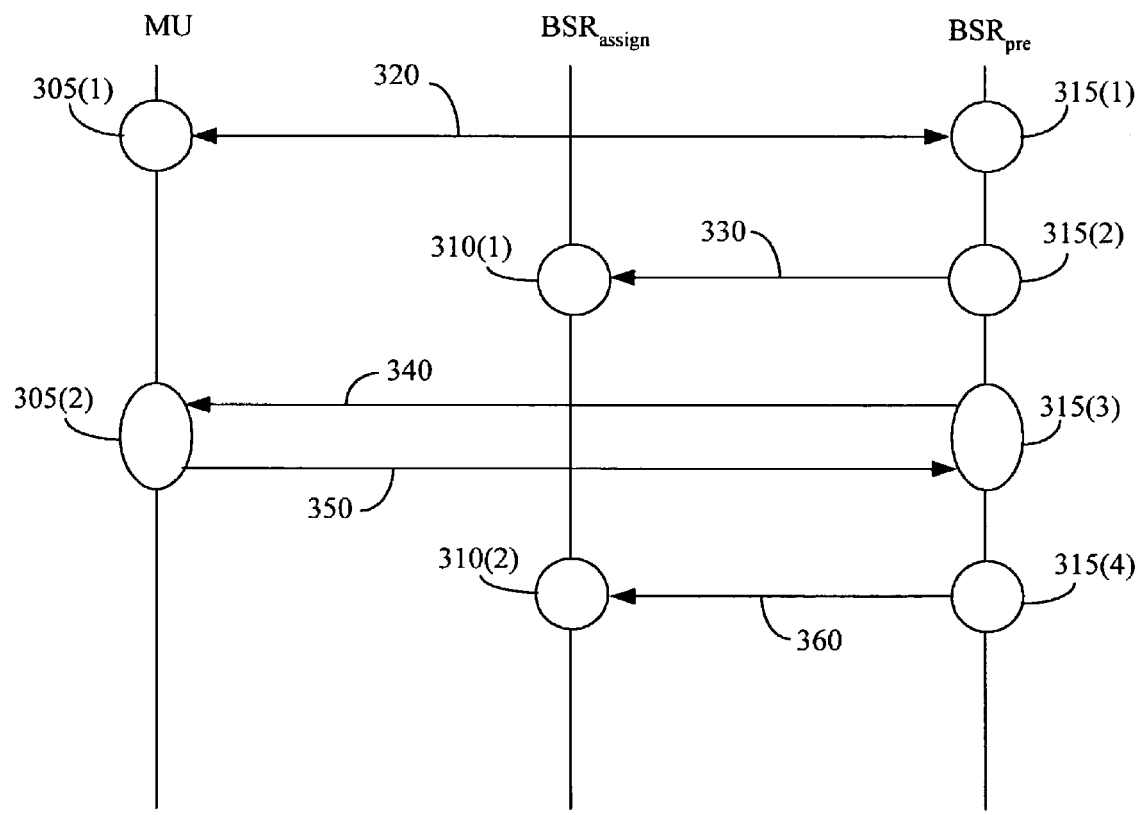
FIG. 2 conceptually illustrates a call session identifier that may be used in the distributed wireless telecommunication system shown in FIG. 1, in accordance with the present invention.
FIG. 3 conceptually illustrates one embodiment of a method of migrating information prior to dormancy of a call session, in accordance with the present invention.

FIG. 2 conceptually illustrates a call session identifier 200 that may be used in the wireless telecommunication system 100 shown in FIG. 1. In the illustrate embodiment, the call session identifier 200 is a UATI that includes a UATI104 portion 205 having 104 bits and a UATI024 portion 210 having 24 bits. The illustrated UATI104 portion 205 includes a 72-bit subnet identifier 215 and a 32-bit base station router IP address. The illustrated UATI024 portion 210 includes a 12-bit base station router identifier that is unique within a subnet or color code and a 12-bit call session identifier. In one embodiment, the UATI024 portion 210 and a color code uniquely identifies a call session within the distributed wireless telecommunication system 100. Persons of ordinary skill in the art should appreciate that the present invention is not limited to this specific embodiment of a UATI call session identifier 200. In alternative embodiments, any desirable call session identifier 200 having any desirable structure and/or number of bits may be used.

In the illustrated embodiment, the 12 call session bits in the UATI024 may represent up to 4096 call sessions, which may include active and/or dormant call sessions. The 12 base station router identifier bits may represent up to 4096 base station routers within a subnet or color code. Accordingly, as will be discussed in detail below, when a mobile unit moves from a first (serving) base station to a second (target) base station within the same subnet or color code, the target base station router may identify the serving base station router using the UATI024 portion 210. The target base station router may then retrieve call session information from the serving base station router.

In one embodiment, the 8-bit color code and the 24-bit IP address in the UATI104 portion 205 may be transmitted to one or mobile units in a sector parameter message. The mobile units may reject these messages if the relevant portions of the UATI and the sector parameter message do not match. Thus, logical IP addresses and color codes may be used in the UATI104 portion 205. The logical IP addresses may be different than the actual IP address of the base station router, so a translation table may be used to arrive at the actual IP address of a base station router. In one alternative embodiment, a range of numerical values may be used in place of the bit-based base station router identifier. This approach may allow for a more flexible range and more efficient use of the available bits.

Referring back to FIG. 1, operation of one exemplary embodiment of the distributed wireless telecommunication system 100 will now be described. A call session is established between the mobile unit 110 and the base station router 105(1). As part of the establishment procedure, the base station router 105(1) assigns a call session identifier to the call session. As discussed above, the call session identifier may be a UATI. For example, the call session identifier may be a UATI that includes a 104-bit UATI104 having a 72-bit subnet identifier that identifies the subnet 125(1) and a 32-bit IP address for the base station router 105(1). The UATI024 may include a 12-bit identifier indicative of the base station router 105(1). The 12-bit identifier indicative of the base station router 105(1) is unique within the subnet 125(1) and/or an 8-bit color code associated with the subnet 125(1). The UATI024 also includes a 12-bit call session identifier that uniquely identifies the call session among other call sessions that may be concurrently established with the base station router 105(1).

After the call session has been established, the mobile unit 110 moves from the cell 120 served by the base station router 105(1) to the cell 120 served by the base station router 105(2). In one embodiment, the base station router 125(2) may re-assign a new UATI to the mobile unit 110, since the base station router 105(2) is in the subnet 125(2), which has a different 8-bit color code than the subnet 125(1). However, re-assignment of the UATI is not always necessary. For example, the mobile unit 110 may move to a base station router (not shown) in the same color code, in which case it may not be necessary to re-assign the UATI. Moreover, in some alternative embodiments, the mobile unit 110 may be in communication with a plurality of base station routers 105, which are usually referred to as an active set. As long as one of the base station routers 105 in the active set has the same color code as the UATI-assigning base station router 105, it may not be necessary to re-assign the UATI. In one embodiment, the call session state information stored on the base station router 105(1) may be migrated to the base station router 105(2).

The call session associated with the mobile unit 110 then becomes dormant. Dormancy refers to the state of the mobile unit 110 after an existing traffic channel between the mobile unit 110 and the base station router 105(2) has been torn down. In various alternative embodiments, dormancy may be triggered by a user powering down the mobile unit 110, silence in a voice communication, the absence of data requiring transmission, and the like. For example, the mobile unit 110 may include a timer that starts when no voice or data is being transmitted or received. If the timer expires, the mobile unit 110 becomes dormant and the traffic channel may be torn down. Prior to becoming dormant, the mobile unit 110 may carry out one or more pre-dormancy activities, which may include migrating information between various base station routers 105.

FIG. 3 conceptually illustrates one embodiment of a method 300 of migrating information prior to dormancy of a call session. In the embodiment shown in FIG. 3, actions associated with a mobile unit (MU) are indicated by the indices 305(1-2), actions associated with an assigning base station router ($BSR_{assign}$) are indicated by the indices 310(1-2), and actions associated with a pre-dormancy serving base station router ($BSR_{pre}$) are indicated by the indices 315(1-4). Arrows 320, 330, 340, 350, 360 are indicative of data transmission and/or reception during one or more of the actions 305(1-2), 310(1-2), 315(1-4). Persons of ordinary skill in the art should appreciate that the present invention is not limited to the actions 305(1-2), 310(1-2), 315(1-4). In alternative embodiments, more or fewer actions may take place during pre-dormancy migration.

At actions 305(1) and 315(1), the mobile unit (MU) and the pre-dormant (or primary) base station router ($BSR_{pre}$) are communicating, as indicated by the arrow 320. Since it is the natural condition for all protocols to attempt to migrate to the serving base station router, i.e. the pre-dormant base station router ($BSR_{pre}$), information may be migrated to the pre-dormant base station router ($BSR_{pre}$) prior to going into dormancy so that the pre-dormant base station router ($BSR_{pre}$) may contain all of the protocols for the call session. However, the call session identifier, such as a UATI, is not typically migrated from the assigning base station router ($BSR_{assign}$) to the pre-dormant base station router ($BSR_{pre}$) in conventional migration schemes. Thus, in one embodiment of the present invention, the UATI is migrated from the assigning base station router ($BSR_{assign}$) to the pre-dormant base station router ($BSR_{pre}$) prior to dormancy, as described in detail below. Migrating the UATI prior to dormancy may simplify the process of re-activating the dormant call.

At action 315(2), the pre-dormant base station router ($BSR_{pre}$) provides a signal indicated by the arrow 330. The signal 330 includes a call session identifier, such as a UATI, which may be provided when data-flow has stopped after a dormancy timer has reached a predetermined time-out period. At action 310(1), the assigning base station router ($BSR_{assign}$), which originally assigned the UATI to the mobile unit MU, receives the signal 330 and logs the identity of the last serving primary BSR, i.e. the pre-dormant base station router ($BSR_{pre}$).

At action 315(3), the pre-dormant base station router ($BSR_{pre}$) sends a UATI Assignment message, indicated by arrow 340, to the mobile unit (MU) prior to traffic channel de-allocation. At action 305(2), the mobile unit (MU) receives the UATI Assignment message 340, updates its UATI for the call session, and acknowledges by sending a UATI-Complete message back to the pre-dormant base station router ($BSR_{pre}$), as indicated by the arrow 350. If this sequence completes successfully, the pre-dormant base station router ($BSR_{pre}$) becomes the assigning base station router ($BSR_{assign}$).

At action 315(4), one or more messages, indicated by arrow 360, may be sent to the old assigning base station router ($BSR_{assign}$) telling it that a new UATI has been assigned for this call session. At action 310(2), the old assigning base station router ($BSR_{assign}$) receives the message 360 and frees the previously assigned UATI. The old assigning base station router ($BSR_{assign}$) may now allocate the previously assigned UATI to another call session.

Once the pre-dormancy migration 300 is complete, the mobile unit (MU) may become dormant. However, persons of ordinary skill in the art should appreciate that pre-dormancy migration is an optional operation and, in some embodiments, no pre-dormancy migration may occur. For example, the mobile unit (MU) may unexpectedly become dormant due to some unexpected event. Alternatively, some embodiments of the mobile unit (MU) may not be configured to execute a pre-dormancy routine such as described above.

Referring back to FIG. 1, the dormant mobile unit 110 becomes associated with the base station router 105(4). For example, the user may carry the mobile unit 110 into a region serviced by the base station router 105(4). For another example, changing environmental conditions may result in the base station router 105(4) providing superior quality of service to the mobile unit 110. However, since the mobile unit 110 is dormant, the base station router 105(4) may not be aware of the presence of the mobile unit 110. Thus, when the mobile unit 110 is re-activated, the mobile unit 110 provides an identifier indicative of the dormant call session to the base station router 105(4). The base station router 105(4) then uses the call session identifier to identify the base station router 105 that assigned the identifier indicative of the dormant call session. If the call session state information associated with the dormant call has migrated to the base station router 105(2), then the base station router 105(4) may use the identifier to identify the base station router 105(2) directly and may access the call state information on the base station router 105(2). Alternatively, if the call session state information associated with the dormant call has not been migrated to the base station router 105(2), then the base station router 105(4) may identify the base station router 105(1) based on the call session identifier. The base station router 105(1) may then identify the base station router 105(2) that previously provided service to the mobile unit 110 and the base station router 105(4) may access the call session state information on the base station router 105(2). The dormant call session may then be re-activated using the accessed call session state information.

Figure 4:
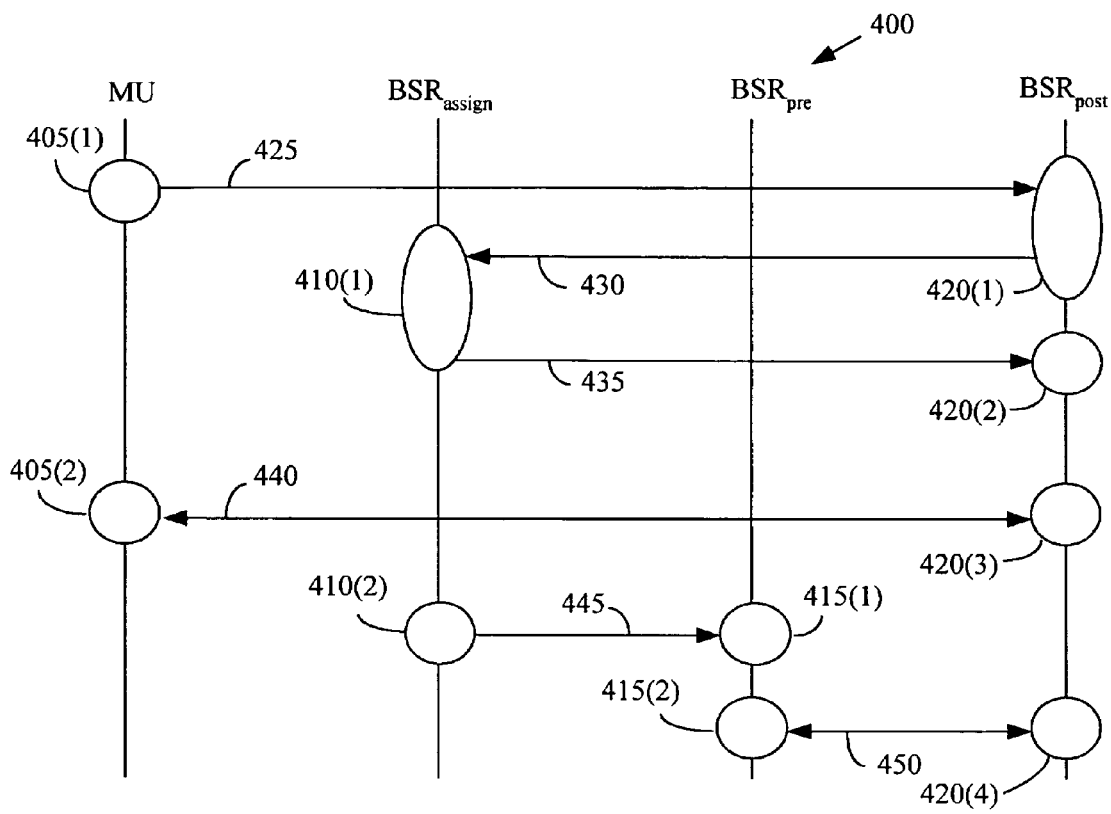
FIG. 4 conceptually illustrates a first embodiment of a method of re-activating a dormant call session, in accordance with the present invention.

FIG. 4 conceptually illustrates a first embodiment of a method 400 of re-activating a dormant call session. In the embodiment shown in FIG. 4, actions associated with a mobile unit (MU) are indicated by the indices 405(1-2), actions associated with an assigning base station router ($BSR_{assign}$) are indicated by the indices 410(1-2), actions associated with a pre-dormancy base station router ($BSR_{pre}$) are indicated by the indices 415(1-2), and actions associated with a post-dormancy base station router ($BSR_{post}$) are indicated by the indices 420(1-4). Arrows 425, 430, 435, 440, 445, 450 are indicative of data transmission and/or reception during one or more of the actions 405(1-2), 410(1-2), 415(1-2), 420(1-4). Persons of ordinary skill in the art should appreciate that the present invention is not limited to the actions 405(1-2), 410(1-2), 415(1-2), 420(1-4). In alternative embodiments, more or fewer actions may take place during re-activation of a dormant call session.

In the first embodiment of the method 400, the mobile unit (MU) initiates re-activation. For example, the mobile unit (MU) may initiate re-activation based upon user input, such as a voice signal, input to a keypad, a power-up sequence, and the like. When the mobile unit (MU) wakes up from dormancy, a call session identifier may be used to find the location of the assigning base station router ($BSR_{assign}$), which may have call session state information stored thereon. In the illustrated embodiment, the call session identifier is a UATI. However, persons of ordinary skill in the art should appreciate that any desirable call session identifier may be used. Alternatively, some or all of the call session state information may be stored on the pre-dormancy base station router ($BSR_{pre}$), and the assigning base station router ($BSR_{assign}$) may have information indicative of the location of the pre-dormancy base station router ($BSR_{pre}$).

At action 405(1), the mobile unit (MU) initiates traffic channel setup procedure by sending a Connection Request Message, indicated by the arrow 425, to the post-dormancy base station router ($BSR_{post}$). The Connection Request Message includes the UATI associated with the mobile unit (MU). At action 420(1), the post-dormancy base station router ($BSR_{post}$) receives the Connection Request Message 425 including the UATI. Using the UATI, the post-dormancy base station router ($BSR_{post}$) contacts the assigning base station router ($BSR_{assign}$) to verify the state of the UATI. In one embodiment, the post-dormancy base station router ($BSR_{post}$) contacts the assigning base station router ($BSR_{assign}$) by sending a message, as indicated by the arrow 430.

At action 410(1), the assigning base station router ($BSR_{assign}$) determines whether or not the transmitted state of the UATI is valid. If valid, the assigning base station router ($BSR_{assign}$) sends the address of the pre-dormancy base station router ($BSR_{pre}$) that served the UATI, as indicated by the arrow 435. At action 420(2), the post-dormancy base station router ($BSR_{post}$) receives the message 435 including the address and prepares to instantiate forward and reverse-link Resource Layer Protocols (RLP). In one embodiment, the post-dormancy base station router ($BSR_{post}$) knows to forward any reverse-link packets to PPP at the pre-dormancy base station router ($BSR_{pre}$).

At actions 405(2) and 420(3), the post-dormancy base station router ($BSR_{post}$) and the mobile unit (MU) complete the traffic channel setup procedure. In the illustrated embodiment, the traffic channel, as well as the signaling used to establish the traffic channel, is indicated by the arrow 440. Where possible, traffic channel setup can occur simultaneously with other signaling. At actions 410(2) and 415(1), the assigning base station router ($BSR_{assign}$) communicates with the pre-dormancy base station router ($BSR_{pre}$), as indicated by the arrow 445. In one embodiment, the assigning base station router ($BSR_{assign}$) tells the pre-dormancy base station router ($BSR_{pre}$) that the post-dormancy base station router ($BSR_{post}$) is re-activating communication to the mobile unit (MU). The pre-dormancy base station router ($BSR_{pre}$) receives the message 445 and may then reactivate its protocol stack with the exception that forward and reverse-link RLP may be done at the post-dormancy base station router ($BSR_{post}$). This means that on startup, forward-link user data from PPP may be tunneled directly to the post-dormancy base station router ($BSR_{post}$).

At actions 415(2) and 420(4), forward and reverse-link traffic may be tunneled between the pre-dormancy base station router ($BSR_{pre}$) and the post-dormancy base station router ($BSR_{post}$), as indicated by arrow 450. The post-dormancy base station router ($BSR_{post}$) may receive the address 450 and prepare to instantiate forward and reverse-link RLP. In one embodiment, the post-dormancy base station router ($BSR_{post}$) knows to forward any reverse-link packets to PPP at the pre-dormancy base station router ($BSR_{pre}$). At this point, active migration of all BSR protocol states to the post-dormancy base station router ($BSR_{post}$) may begin, as will be described in detail below.

Re-activation of the mobile unit (MU) from dormancy in the above described manner may reduce the time that may elapse before the mobile unit (MU) is able to receive traffic. In the above described embodiment, the protocol states are reactivated with RLP being done at the post-dormancy base station router ($BSR_{post}$) while all of the other states are done at the pre-dormancy base station router ($BSR_{pre}$), which last served the call session. Migration of all of the protocol states to the post-dormancy base station router ($BSR_{post}$) may then proceed during the active call session.

Figure 5:
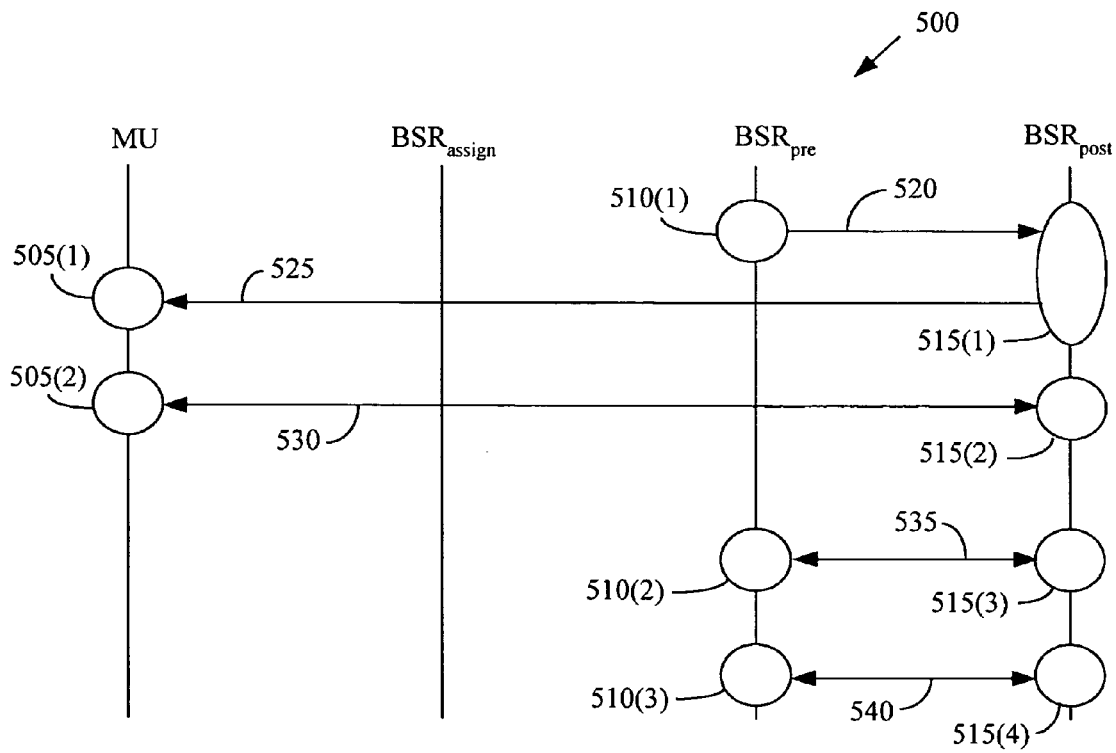
FIG. 5 conceptually illustrates a second embodiment of a method of re-activating a dormant call session, in accordance with the present invention.

FIG. 5 conceptually illustrates a second embodiment of a method 500 of re-activating a dormant call session, in accordance with the present invention. In the second embodiment shown in FIG. 5, actions associated with a mobile unit (MU) are indicated by the indices 505(1-2), actions associated with a pre-dormancy base station router ($BSR_{pre}$) are indicated by the indices 510(1-3), and actions associated with a post-dormancy base station router ($BSR_{post}$) are indicated by the indices 515(1-4). Arrows 520, 525, 530, 540, 545 are indicative of data transmission and/or reception during one or more of the actions 505(1-2), 510(1-3), 515(1-4). Persons of ordinary skill in the art should appreciate that the present invention is not limited to the actions 505(1-2), 510(1-3), 515(1-4). In alternative embodiments, more or fewer actions may take place during re-activation of a dormant call session.

In the second embodiment of the method 500, the distributed network initiates re-activation. In one embodiment, re-activation is initiated when data intended for the mobile unit (MU) is received by the distributed network. For example, forward-link data arriving from the network may be forwarded to the pre-dormancy base station router ($BSR_{pre}$), which may initiate a paging process to locate the mobile unit (MU) in response to receiving the forward link data. The paging process will be discussed in greater detail below.

At action 510(1), forward-link data arriving at the pre-dormancy base station router ($BSR_{pre}$) forces it to initiate the paging process to locate the dormant mobile unit (MU). In one embodiment, the pre-dormancy base station router ($BSR_{pre}$) sends paging requests, as indicated by arrow 520, to neighboring BSRs according to a paging strategy. Along with the paging request 520, the IP address of the pre-dormancy base station router ($BSR_{pre}$) is sent along with the associated UATI. In one embodiment, the paging strategy is implemented in a distributed manner in which a paging area consists of a group of neighboring base station routers. When forward link data arrives at the PPP layer on the pre-dormancy base station router ($BSR_{pre}$), the pre-dormancy base station router ($BSR_{pre}$) may determine the UATI associated with the mobile unit based upon the forward link data. The pre-dormancy base station router ($BSR_{pre}$) may then translate the UATI to determine the base station router's IP address and use this address to send page messages to other base station routers in a subnet indicated by a color code in the UATI. In one embodiment, the paging strategy may also include defining one or more subgroups so that paging may be done in an optimal manner without utilizing all of the resources of the pre-dormancy base station router ($BSR_{pre}$). If the pre-dormancy base station router ($BSR_{pre}$) is at or near a color code boundary, the paging subgroups could exist in multiple color codes. In alternative embodiment, the paging requests may be sent across color codes.

At action 515(1), the post-dormancy base station router ($BSR_{post}$) receives the paging message 520, which may include the UATI and/or the IP address of the pre-dormancy base station router ($BSR_{pre}$). The post-dormancy base station router ($BSR_{post}$) then sends a page 525 to the mobile unit (MU). If the mobile unit (MU) responds, the post-dormancy base station router ($BSR_{post}$) knows to direct any reverse-link traffic PPP located at the pre-dormancy base station router ($BSR_{pre}$). In one embodiment, the post-dormancy base station router ($BSR_{post}$) prepares to instantiate forward and reverse-link RLP.

At action 505(2) and 515(2), the mobile unit (MU) receives a page 530, recognizes its UATI, and initiates the traffic channel setup procedure by sending a Connection Request message (also indicated by the arrow 530) to the post-dormancy base station router ($BSR_{post}$). The post-dormancy base station router (BSR$_{post}$) responds and then the mobile unit MU) and the post-dormancy base station router (BSR$_{post}$) complete the traffic channel setup procedure. Where possible, traffic channel setup can occur simultaneously with other signaling.

At action 515(3), the post-dormancy base station router (BSR$_{post}$) may provide a message 535 to the pre-dormancy base station router (BSR$_{pre}$) indicating that the post-dormancy base station router (BSR$_{post}$) is reactivating communication to the mobile unit (MU). The message 535 may also inform the pre-dormancy base station router (BSR$_{pre}$) of the address of the post-dormancy base station router (BSR$_{post}$). At action 510(2), the pre-dormancy base station router (BSR$_{pre}$) receives the message 535 and reactivates its protocol stack with the exception that forward and reverse-link RLP will be done at the post-dormancy base station router (BSR$_{post}$). This means that on startup, forward-link user data shall be tunneled directly to the post-dormancy base station router (BSR$_{post}$).

At actions 510(3) and 515(4), forward and reverse-link traffic is tunneled between the pre-dormancy base station router (BSR$_{pre}$) and the post-dormancy base station router (BSR$_{post}$), as indicated by arrow 540. The pre-dormancy base station router (BSR$_{pre}$) receives the message 540 and reactivates its protocol stack with the exception that forward and reverse-link RLP will be done at the post-dormant BSR. This means that on startup, forward-link user data shall be tunneled directly to the post-dormancy base station router (BSR$_{post}$).

Re-activation of the mobile unit (MU) from dormancy in the above described manner may allow the mobile unit (MU) to receive traffic at the earliest possible time. In the above embodiment, the protocol states are reactivated with RLP being done at the post-dormancy base station router (BSR$_{post}$), which last served the call. Migration of all of the protocol states to the post-dormancy base station router (BSR$_{post}$) can proceed during the active call.

Referring back to FIG. 1, in one alternative embodiment, the mobile unit 110 may determine that a color code associated with the base station router 105(4) has changed while the mobile unit 110 was dormant. For example, the mobile unit 110 may listen on an overhead channel for sector parameters and thereby detect that it is in a new coverage area associated with a new color code. The mobile unit 110 may then transmits its call session identifier to the base station router 105(4), which may determine the address of the base station router 105(3), at least in part based upon the color code of the base station router 105(3) indicated by the call session identifier. The base station router 105(4) may then retrieve call session state information from the base station router 105(3). In one embodiment, the mobile unit 110 may also request reassignment of the call session identifier when it emerges from dormancy.

In one embodiment, an address translation request message/response to any base station router 105 within a color code group may be provisioned in all the base station routers 105 to avoid having to store all the base station router IP addresses in all the base station routers 105 in all color code regions. Accordingly, one base station router may perform address translation request for all the base station routers 105 in a color coded region when a request is received from a base station router 105 in another color coded group. Alternatively, the message/response may be handled by a network management center (not shown). In that case, the network management center may store all the base station router IP addresses for all color coded regions.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of wireless communication in a distributed network comprised of a plurality of access points, comprising:
   receiving, at a first access point to the distributed network, information indicating that a dormant call session between a mobile unit and a second access point is to be activated by a third access point; and
   providing, from the first access point to the third access point, an identifier indicative of the dormant call session and the second access point, call session state information for a call session being stored on the second access point prior to the call session becoming dormant, the identifier being provided in response to the first access point receiving said information indicating that the dormant call session is to be activated.

2. The method of claim 1, comprising establishing a traffic channel between the mobile unit and the third access point concurrently with migrating call session state information from the second access point to the third access point.

3. The method of claim 2, wherein receiving information indicating that the dormant call session is to be activated comprises receiving at least one of user input indicating that the dormant call session is to be activated, an indication that data is available to be transmitted to the mobile unit associated with the dormant call session, and a paging message.

4. The method of claim 2, comprising accessing the information indicative of the state of the call session, providing the information indicative of the state of the call session to the third access point, and forming the traffic channel between a mobile unit and the third access point.

5. The method of claim 4, wherein providing the identifier indicative of the dormant call session comprises providing a Unicast Access Terminal Identifier (UATI) indicative of the dormant call session.

6. The method of claim 5, wherein establishing the traffic channel comprises instantiating, at the third access point, the forward link and reverse link resource layer protocols for communication with the mobile unit concurrently with migrating protocol states associated with the mobile unit from the second access point to the third access point.

7. The method of claim 6, comprising tunneling forward link user data to the third access point following instantiation of the forward link resource layer protocols.

8. The method of claim 7, comprising providing reverse link data from the third access point to the second access point until completion of migration of the protocol states associated with the mobile unit from the second access point to the third access point.

* * * * *